United States Patent
Nagahama

(10) Patent No.: US 9,198,347 B2
(45) Date of Patent: Dec. 1, 2015

(54) WORK MACHINE HAVING OPERATION ROD

(71) Applicant: MAKITA CORPORATION, Aichi (JP)

(72) Inventor: Tatsuya Nagahama, Aichi (JP)

(73) Assignee: MAKITA CORPORATION, Aichi (JP)

( * ) Notice: Subject to any disclaimer, the term of this patent is extended or adjusted under 35 U.S.C. 154(b) by 126 days.

(21) Appl. No.: 14/102,885

(22) Filed: Dec. 11, 2013

(65) Prior Publication Data

US 2014/0208599 A1 Jul. 31, 2014

(30) Foreign Application Priority Data

Jan. 31, 2013 (JP) .................................. 2013-016870
Jan. 31, 2013 (JP) .................................. 2013-016871

(51) Int. Cl.
*A01D 34/78* (2006.01)
*A01D 34/68* (2006.01)
(Continued)

(52) U.S. Cl.
CPC ............ *A01D 34/78* (2013.01); *A01D 34/6806* (2013.01); *A01D 34/90* (2013.01); *H02P 6/16* (2013.01)

(58) Field of Classification Search
CPC ....... A01G 3/053; A01D 34/90; A01D 69/02; A01D 34/6806; A01D 34/78; B25G 3/18; H02J 7/0045; Y10S 30/01; B25F 3/00; B25F 5/02; B26B 19/28; H01R 13/639; H02P 6/16
USPC .......... 30/277.4, 276, 296.1, 166.3, 381, 122, 30/208, 347, 272.1, DIG. 1; 439/680, 678, 439/677, 135, 928, 13, 18, 20, 21, 23, 577; 56/14.7; 15/328, 405; 173/217
See application file for complete search history.

(56) References Cited

U.S. PATENT DOCUMENTS 4,733,471 A 3/1988 Rahe
4,748,355 A * 5/1988 Anderson et al. ............... 310/71
(Continued)

FOREIGN PATENT DOCUMENTS

CN 101267181 9/2008
CN 102380856 3/2012
(Continued)

OTHER PUBLICATIONS

Chinese Office Action (including English language translation), mailed Jul. 3, 2015, from the State Intellectual Property Office of the People's Republic of China (SIPO), for the corresponding Chinese Patent Application No. 20140034767.6.

*Primary Examiner* — Ghassem Alie
(74) *Attorney, Agent, or Firm* — Greenblum & Bernstein, P.L.C.

(57) ABSTRACT

A work machine includes a motor and a sensor disposed in a front unit, a motor controller disposed in a rear unit, a motor power line and a sensor signal line disposed along an operation rod, and a pair of electric connectors. The motor power line includes first and second partial motor power lines disposed along the first and second partial rods respectively. The sensor signal line includes first and second partial sensor signal lines disposed along the first and second partial rods respectively. A first electric connector includes first electric terminals, each of which is coupled with corresponding one of the first partial motor power line or the first partial sensor signal line, and a second electric connector includes second electric terminals, each of which is coupled with corresponding one of the second partial motor power line or the second partial sensor signal line.

20 Claims, 16 Drawing Sheets

(51) Int. Cl.
  *A01D 34/90* (2006.01)
  *H02P 6/16* (2006.01)

(56) References Cited

U.S. PATENT DOCUMENTS

| | | | |
|---|---|---|---|
| 5,802,724 A | 9/1998 | Rickard et al. | |
| 5,809,653 A | 9/1998 | Everts et al. | |
| 5,903,117 A * | 5/1999 | Gregory | 318/400.09 |
| 7,484,300 B2 * | 2/2009 | King et al. | 30/296.1 |
| 7,816,877 B2 | 10/2010 | Itoh et al. | |
| 2004/0036429 A1 * | 2/2004 | Fujita et al. | 318/254 |
| 2008/0073988 A1 * | 3/2008 | Kataoka et al. | 310/71 |
| 2008/0196256 A1 * | 8/2008 | Gieske et al. | 30/277.4 |
| 2008/0224640 A1 | 9/2008 | Itoh et al. | |
| 2011/0036607 A1 * | 2/2011 | Habele et al. | 173/162.2 |
| 2011/0284255 A1 * | 11/2011 | Ookubo et al. | 173/109 |
| 2012/0048588 A1 | 3/2012 | Iyoda et al. | |
| 2014/0225546 A1 * | 8/2014 | Sato | 318/400.26 |

FOREIGN PATENT DOCUMENTS

| | | |
|---|---|---|
| EP | 0822036 | 2/1998 |
| JP | 10-89322 | 4/1998 |

* cited by examiner

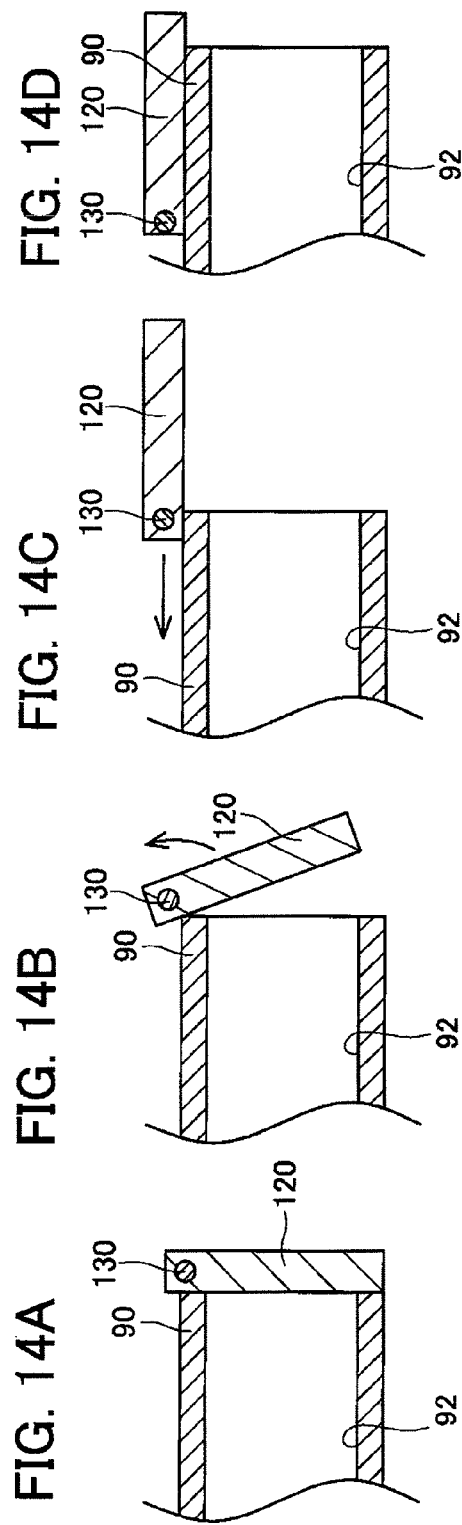

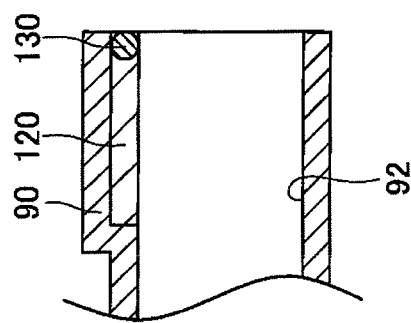
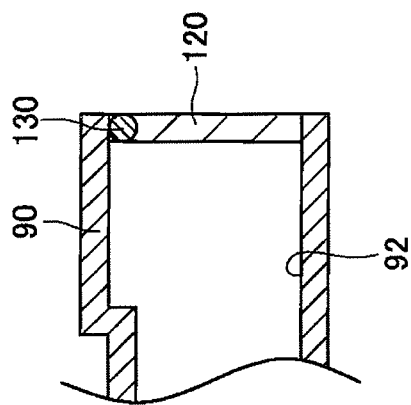
FIG. 15A
FIG. 15B

WORK MACHINE HAVING OPERATION ROD

CROSS-REFERENCE TO A RELATED APPLICATIONS

This application claims priority to Japanese Patent Applications No. 2013-016870 filed on Jan. 31, 2013 and No. 2013-016871 filed on Jan. 31, 2013, the contents of which are hereby incorporated by reference into the present application.

TECHNICAL FIELD

The present teachings relates to a work machine having an operation rod. Known work machines of this kind include, for example: a cutter (also known as a "brush cutter"), a pole hedge trimmer, a pole saw, or a pole trimmer.

DESCRIPTION OF RELATED ART

Japanese Patent Application Publication No. H10-89322 (JP H10-089322 A) discloses a work machine having an operation rod. This work machine includes: an operation rod which can be separated into a first partial rod and a second partial rod; a front unit disposed at a front end of the operation rod, to which a tool is attached; a motor disposed at a rear end of the operation rod, which drives the tool; two motor power lines disposed along the operation rod, which transmit electric power output from a battery to the motor; and a pair of electric connectors which electrically connect the two motor power lines. The pair of electric connectors includes a first electric connector disposed on the first partial rod and a second electric connector disposed on the second partial rod. The first electric connector and the second electric connector are electrically connected to each other when the first partial rod and the second partial rod are coupled with each other.

SUMMARY

In the conventional work machine described above, only two motor power lines are provided along the operation rod. In a composition of this kind, it is not possible to adjust the electric power supplied to the motor in accordance with the state of the motor.

In order to address the above mentioned problem, a work machine disclosed herein comprises an operation rod configured to be separated into at least a first partial rod and a second partial rod, a front unit disposed at a front end of the operation rod and configured to attach a tool, a rear unit disposed at a rear end of the operation rod and configured to attach a battery, a motor disposed in the front unit and configured to drive the tool, at least one sensor disposed in the front unit and configured to detect a condition index of the motor, a motor controller disposed in the rear unit and electrically coupled with the battery, at least one motor power line disposed along the operation rod and configured to transmit electric power outputted from the motor controller to the motor, at least one sensor signal line disposed along the operation rod and configured to transmit a signal outputted from the at least one sensor to the motor controller, and a pair of electric connectors including a first electric connector disposed on the first partial rod and a second electric connector disposed on the second partial rod, the first and second electric connectors being configured to be electrically connected to each other when the first and second partial rods are coupled with each other.

The motor power line comprises a first partial motor power line disposed along the first partial rod and electrically coupled with the first electric connector, and a second partial motor power line disposed along the second partial rod and electrically coupled with the second electric connector. The sensor signal line comprises a first partial sensor signal line disposed along the first partial rod and electrically coupled with the first electric connector, and a second partial sensor signal line disposed along the second partial rod and electrically coupled with the second electric connector. The first electric connector comprises a plurality of first electric terminals, each of which is coupled with corresponding one of the first partial motor power line or the first partial sensor signal line. The second electric connector comprises a plurality of second electric terminals, each of which is coupled with corresponding one of the second partial motor power line or the second partial sensor signal line. And, each of the plurality of first electric terminals is electrically connected to corresponding one of the plurality of second electric terminals when the first and second partial rods are coupled with each other.

According to the composition described above, it is possible to observe the condition of the motor which is disposed in the front unit, by a motor controller which is disposed in a rear unit, and electric power supplied to the motor can be adjusted in accordance with the condition of the motor.

BRIEF DESCRIPTION OF DRAWINGS

FIGS. 14A to 14D show modification examples of a movable lid.

FIGS. 15A and 15B show modification examples of a movable lid.

DETAILED DESCRIPTION

Figure 1:
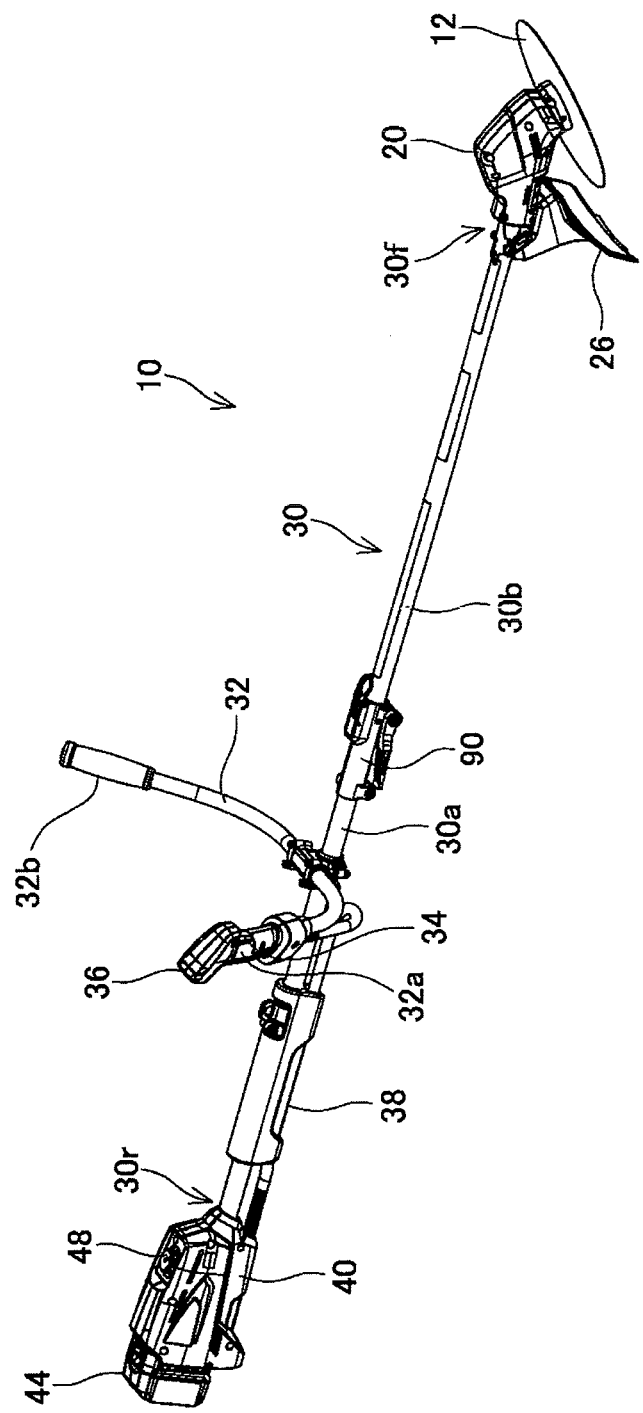
FIG. 1 shows an external view of a brush cutter according to an embodiment.

In one embodiment of the present invention, desirably, one of first electric terminals coupled with a first partial motor power line is larger in size than one of the first electric terminals coupled with a first partial sensor signal line. The first electric terminal coupled with the first partial motor power line carries a larger current than the first electric terminal coupled with the first partial sensor signal line. For this reason, it is possible to suppress generation of heat in the terminal, by using a relatively large terminal for the first electric terminal coupled with the first partial motor power line.

In one embodiment of the present invention, desirably, one of the first electric terminals coupled with the first partial motor power line is identical in size with one of the first electric terminals coupled with the first partial sensor signal line. By adopting a composition of this kind, it is possible to use common parts and the manufacturing costs can be reduced.

In one embodiment of the present invention, desirably, one of second electric terminals coupled with a second partial motor power line is larger in size than one of the second electric terminals coupled with a second partial sensor signal line. The second electric terminal coupled to the second partial motor power line carries a larger current than the second electric terminal coupled to the second partial sensor signal line. For this reason, it is possible to suppress generation of heat in the terminal, by adopting a relatively large terminal for the second electric terminal coupled to the second partial motor power line.

In one embodiment of the present invention, desirably, the second electric terminal coupled with the second partial motor power line is identical in size with one of the second electric terminals coupled with the second partial sensor signal line. By adopting a composition of this kind, it is possible to use common parts and the manufacturing costs can be reduced.

In one embodiment of the present invention, desirably, a first electric connector is configured such that two of the first electric terminals coupled with the first partial motor power lines respectively are not adjacent to each other. By adopting a composition of this kind, it is possible to suppress temperature rise in the first electric connector.

In one embodiment of the present invention, desirably, a second electric connector is configured such that two of the second electric terminals coupled with the second partial motor power lines respectively are not adjacent to each other. By adopting a composition of this kind, it is possible to suppress temperature rise in the second electric connector.

In one embodiment of the present teachings, desirably, a work machine having an operation rod is one of a cutter (brush cutter), a pole hedge trimmer, a pole saw or a pole trimmer.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved work machines having an operation rod, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment

A brush cutter 10 according to an embodiment of the invention is described here with reference to the drawings. FIG. 1 shows an external appearance of a brush cutter 10. The brush cutter 10 is an electrically powered tool used for bush cutting work. As shown in FIG. 1, the brush cutter 10 is provided with an operation rod 30, a front unit 20 which is disposed at a front end 30f of the operation rod 30, and a rear unit 40 which is disposed at a rear end 30r of the operation rod 30. The operation rod 30 is a hollow pipe member which extends in a straight line from the front end 30f to the rear end 30r.

The operation rod 30 has a first partial rod 30a and a second partial rod 30b, which are composed so as to be separable. The first partial rod 30a is a portion including the rear end 30r of the operation rod 30, and is coupled to a rear unit 40. The second partial rod 30b is a portion including the front end 30f of the operation rod 30, and is coupled to a front unit 20. The first partial rod 30a and the second partial rod 30b are coupled by means of a joint member 90. The first partial rod 30a and the second partial rod 30b are formed respectively using hollow pipe members.

The front unit 20 is composed such that a blade 12 can be attached thereto and detached therefrom. The blade 12 is a tool for a brush cutter 10. The blade 12 in the present embodiment is a circular blade having a plurality of teeth about a perimeter edge, and is made from a metal material. However, the blade 12 is not limited to a composition of this kind, and may be a nylon cord or other cord material, for example. A blade cover 26 is disposed in the vicinity of the front unit 20. The blade cover 26 is fixed to the operation rod 30 and covers a portion of the blade 12.

The rear unit 40 is composed such that a battery pack 44 can be attached thereto and detached therefrom. The battery pack 44 is a power source for the brush cutter 10. The battery pack 44 includes a plurality of rechargeable battery cells. For example, the battery pack 44 according to the present embodiment has ten lithium ion battery cells which are connected together in series, and has a nominal voltage of 36 Volts. A speed dial 48 is provided in the rear unit 40. The speed dial 48 is a manipulation member which is manipulated by the user in order to adjust the speed of rotation of the blade 12. The speed dial 48 is disposed on an upper surface of the rear unit 40, so as to be easily operable by the user. The speed dial 48 is one example of a manipulation member for adjusting the speed, and may also be a manipulation member according to another mode.

A handle 32 to be gripped by the user is provided on the operation rod 30. The handle 32 generally has a U shape and the central portion thereof is fixed to the operation rod 30. A right grip 32a is provided at one end of the handle 32, and a left grip 32b is provided at the other end of the handle 32. Normally, the user is able to use the brush cutter 10 by gripping the right grip 32a with the right hand and gripping the left grip 32b with the left hand. In this case, the front unit 20 is disposed in front of the user and the rear unit 40 is disposed to the rear of the user.

A trigger 34 and a direction selector 36 are provided on the right grip 32a. The trigger 34 and the direction selector 36 are electrically connected to the rear unit 40 by electrical cords 38. The trigger 34 is a manipulation member which is manipulated by the user in order to operate and stop the blade 12. When the user pulls the trigger 34, the blade 12 operates and when the user returns the trigger 34, the blade 12 stops. The trigger 34 is one example of a manipulation member for operating and stopping the blade 12, and it is also possible to use another mode of manipulation member.

The direction selector 36 is a manipulation member which is manipulated by the user in order to switch the direction of rotation of the blade 12. One example of the direction selector 36 is a rocker switch. When the user presses one side of the direction selector 36, the direction of rotation of the blade 12 is set to a forward direction, and when the user presses the other side of the direction selector 36, the direction of rotation of the blade 12 is set to a reverse direction. The direction selector 36 is one example of a manipulation member for switching the direction of rotation of the blade 12, and is not limited to a lock switch, but rather may also be another mode of manipulation member.

Figure 2:
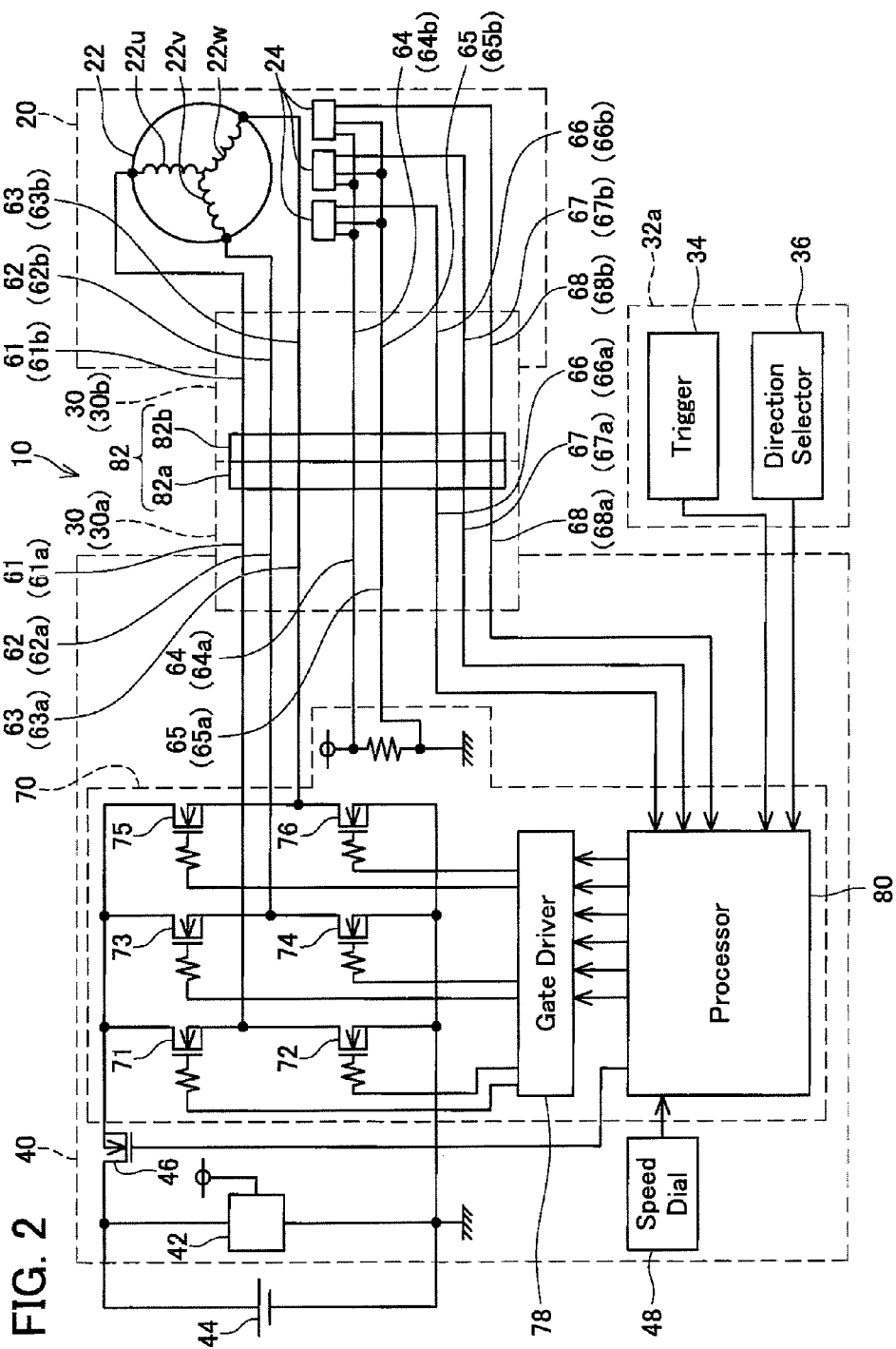
FIG. 2 shows a schematic view of the composition of a brush cutter according to an embodiment.

The internal structure of the brush cutter 10 is now described with reference to FIG. 2. As shown in FIG. 2, the brush cutter 10 includes a brushless motor 22 and three sensors 24. The brushless motor 22 and the three sensors 24 are disposed in the front unit 20, and are accommodated inside a housing of the front unit 20. The brushless motor 22 is a prime mover for driving the blade 12, and is connected mechanically to the blade 12. The brushless motor 22 according to the present embodiment is a three-phase brushless motor, having a U-phase coil 22$u$, a V-phase coil 22$v$ and a W-phase coil 22$w$. The three sensors 24 output a prescribed signal in accordance with the rotational position of the brushless motor 22 (and more precisely, the rotational position of the rotor of the brushless motor 22). One example of the sensor 24 according to the present embodiment is a Hall element. The three sensors 24 may also detect another condition index of the brushless motor 22, instead of the rotational position of the brushless motor 22.

The brush cutter 10 includes a motor controller 70 and three motor power lines 61, 62, 63. The motor controller 70 is disposed in the rear unit 40 and is electrically connected to the battery pack 44. The three motor power lines 61, 62, 63 electrically connect the motor controller 70 disposed in the rear unit 40 with the brushless motor 22 disposed in the front unit 20. The first motor power line 61 is connected to the U-phase coil 22$u$ (or U-phase terminal) of the brushless motor 22, the second motor power line 62 is connected to the V-phase coil 22$v$ (or V-phase terminal) of the brushless motor 22, and the third motor power line 63 is connected to the W-phase coil 22$w$ (or the W-phase terminal) of the brushless motor 22.

The three motor power lines 61, 62, 63 are disposed along the operation rod 30 and extend from the rear unit 40 to the front unit 20. In the present embodiment, the three motor power lines 61, 62, 63 are disposed inside the operation rod 30, but these lines may also be disposed outside the operation rod 30. By this composition, the battery pack 44 is electrically connected to the brushless motor 22 via the motor controller 70. In other words, electric power from the battery pack 44 is supplied to the brushless motor 22 via the motor controller 70.

The brush cutter 10 includes two sensor power lines 64, 65 and three sensor signal lines 66, 67, 68. The two sensor power lines 64, 65 are conductive lines which supply operating power to the three sensors 24 from the rear unit 40. The two sensor power lines 64, 65 are disposed along the operation rod 30 and extend from the rear unit 40 to the front unit 20. The three sensor signal lines 66, 67, 68 are conductive lines which send the output signals of the three sensors 24 to the motor controller 70. The sensor signal lines 66, 67, 68 are disposed along the operation rod 30 and extend from the front unit 20 to the rear unit 40. In the present embodiment, two sensor power lines 64, 65 and three sensor signal lines 66, 67, 68 are disposed inside the operation rod 30, but these may also be disposed outside the operation rod 30.

The brush cutter 10 is provided with a pair of electric connectors 82. The pair of electric connectors 82 include a first electric connector 82$a$ disposed on the first partial rod 30$a$ and a second electric connector 82$b$ disposed on the second partial rod 30$b$. The first electric connector 82$a$ and the second electric connector 82$b$ are composed so as to be mutually attachable and detachable. If the first partial rod 30$a$ and the second partial rod 30$b$ are coupled to each other, the first partial rod 30$a$ and the second partial rod 30$b$ are electrically connected to each other.

The three motor power lines 61, 62, 63, the two sensor power lines 64, 65 and the three sensor signal lines 66, 67, 68 are composed so as to be connectable and disconnectable by a pair of electric connectors 82. In other words, the motor power lines 61, 62, 63 include first partial motor power lines 61$a$, 62$a$, 63$a$ which are disposed along the first partial rod 30$a$, and second partial motor power lines 61$b$, 62$b$, 63$b$ which are disposed along the second partial rod 30$b$. The first partial motor power lines 61$a$, 62$a$, 63$a$ are electrically connected to the first electric connector 82$a$, and the second partial motor power lines 61$b$, 62$b$, 63$b$ are electrically connected to the second electric connector 82$b$. The first partial motor power lines 61$a$, 62$a$, 63$a$ are respectively connected electrically to the second partial motor power lines 61$b$, 62$b$, 63$b$, via the pair of electric connectors 82.

Similarly, the sensor power lines 64, 65 include first partial sensor power lines 64$a$, 65$a$ which are disposed along the first partial rod 30$a$, and second partial sensor power lines 64$b$, 65$b$ which are disposed along the second partial rod 301). The first partial sensor power lines 64$a$, 65$a$ are electrically connected to the first electric connector 82$a$, and the second partial sensor power lines 64$b$, 65$b$ are electrically connected to the second electric connector 82$b$. The first partial sensor power lines 64$a$, 65$a$ are respectively connected electrically to the second partial sensor power lines 64$b$, 65$b$, via the pair of electric connectors 82.

Similarly, the sensor signal lines 66, 67, 68 include first partial sensor signal lines 66$a$, 67$a$, 68$a$ which are disposed along the first partial rod 30$a$, and second partial sensor signal lines 66$b$, 67$b$, 68$b$ which are disposed along the second partial rod 30$b$. The first partial sensor signal lines 66$a$, 67$a$, 68$a$ are electrically connected to the first electric connector 82$a$, and the second partial sensor signal lines 66$b$, 67$b$, 68$h$ are electrically connected to the second electric connector 82$b$. The first partial sensor signal lines 66$a$, 67$a$, 68$a$ are respectively connected electrically to the second partial sensor signal lines 66$b$, 67$b$, 68$b$, via the pair of electric connectors 82.

The brush cutter 10 is provided with a voltage regulator circuit 42 and a cutoff circuit 46. The voltage regulator circuit 42 and the cutoff circuit 46 are disposed in the rear unit 40 and are electrically connected to the battery pack 44. The voltage regulator circuit 42 generates a power source voltage which is supplied to the motor controller 70 and the sensor 24. The cutoff circuit 46 is disposed on a circuit which electrically connects the battery pack 44 and the motor controller 70, and is able to electrically connect or cut off the battery pack 44 and the motor controller 70. The cutoff circuit 46 according to the present embodiment is, for example, a field-effect transistor (for example, a MOSFET). The cutoff circuit 46 may be an insulated gate-type bipolar transistor (for example, an IGBT)

or another switching element. The cutoff circuit 46 is connected to the motor controller 70 and is controlled by the motor controller 70.

Figure 3:
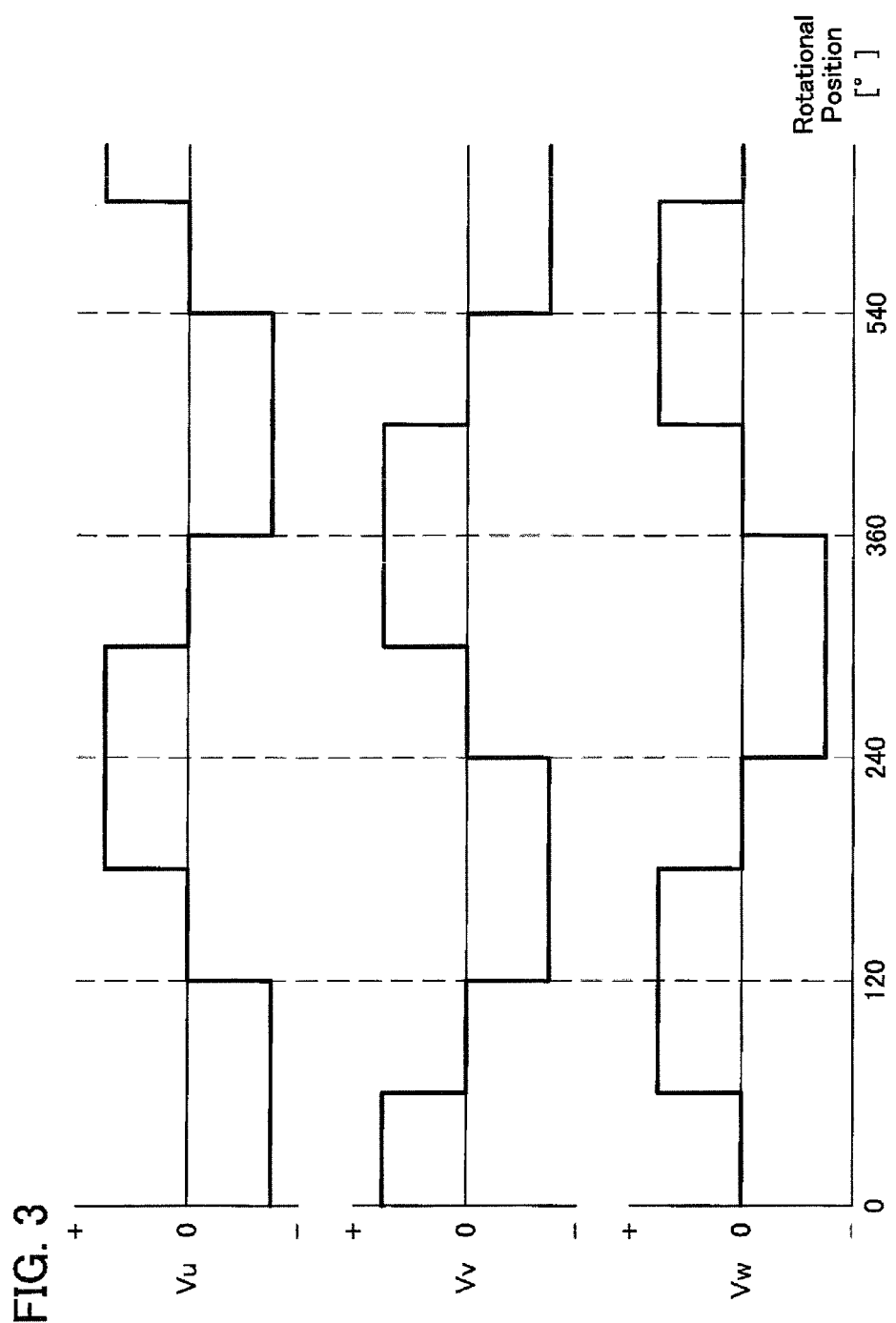
FIG. 3 shows the direction of current flowing in respective coils (motor power lines) of a brushless motor.
Figure 4:
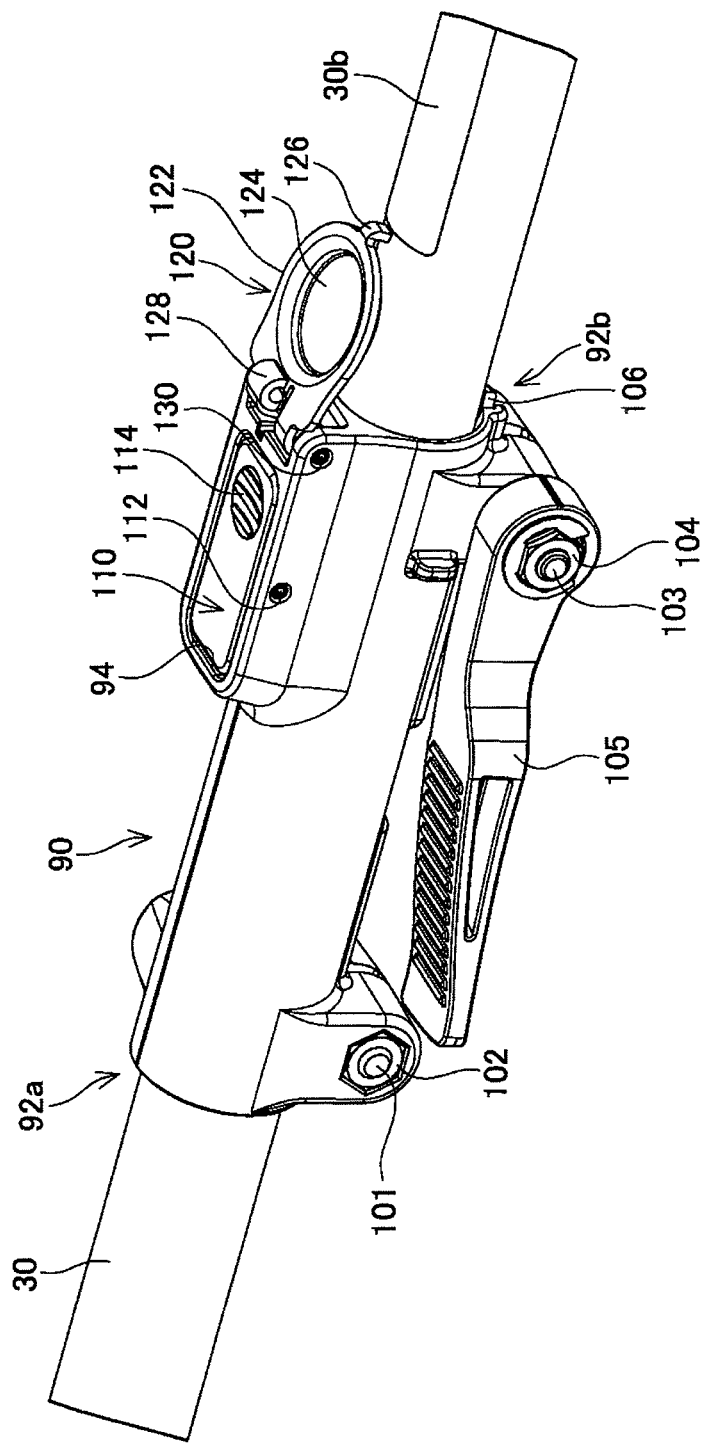
FIG. 4 shows an external view of a first partial rod and a second partial rod which are coupled to each other.
Figure 5:
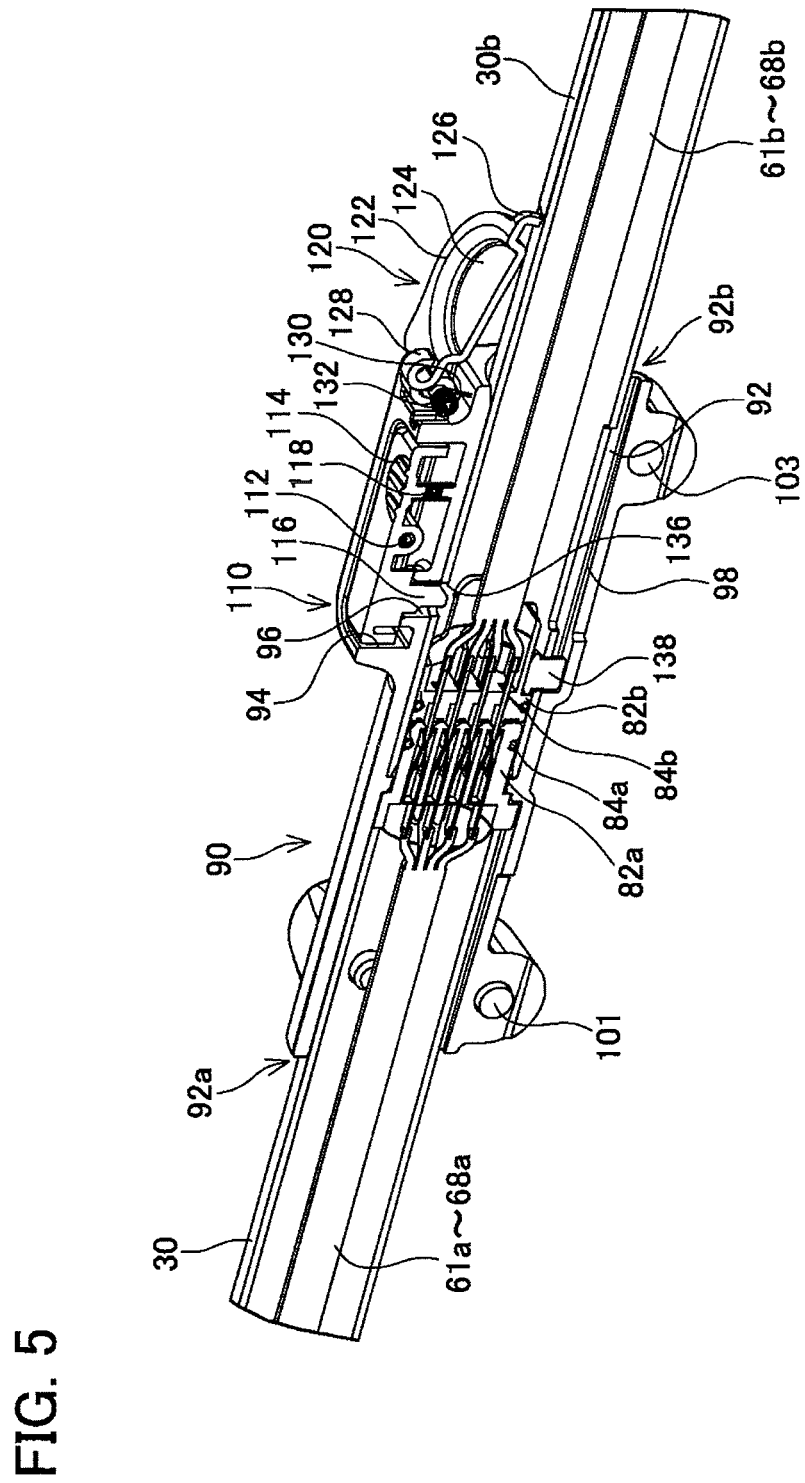
FIG. 5 shows a cross-sectional view of a first partial rod and a second partial rod which are coupled to each other.
Figure 6:
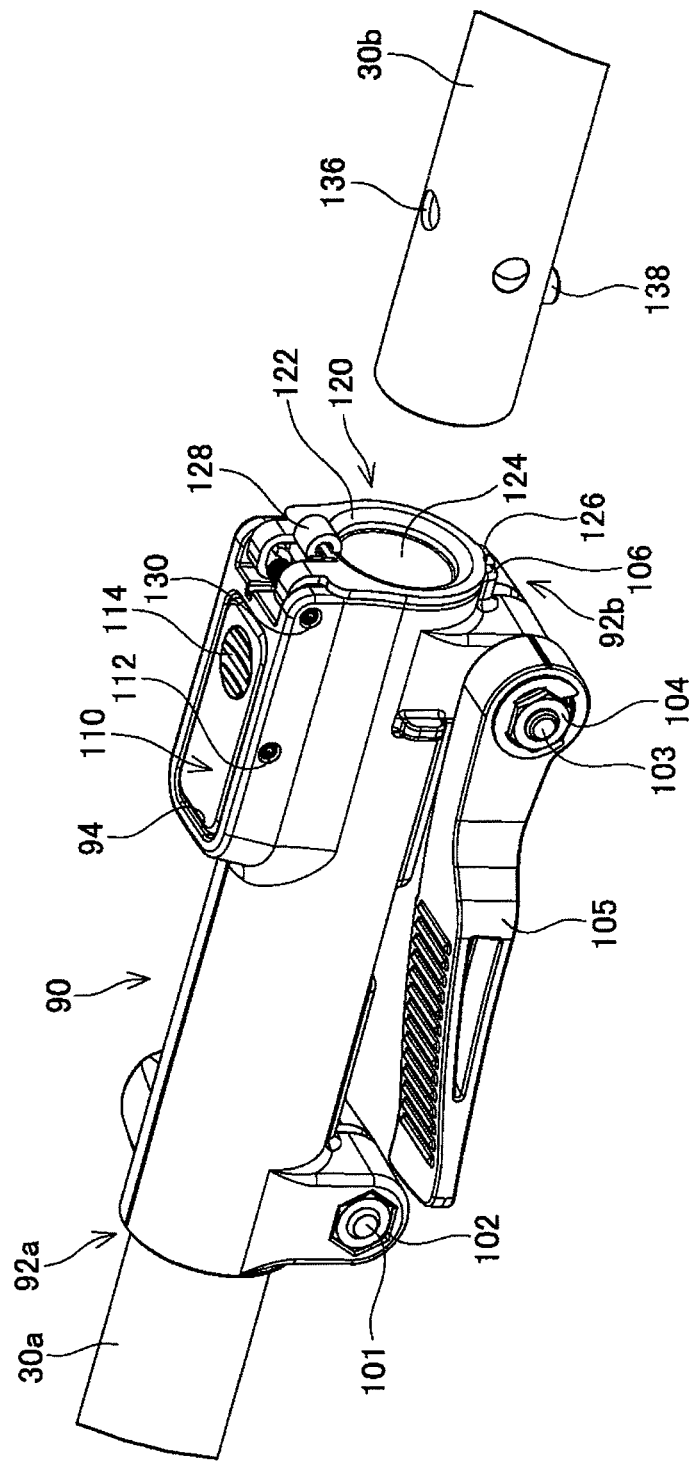
FIG. 6 shows an external view of a first partial rod and a second partial rod which are separated from each other.
Figure 7:
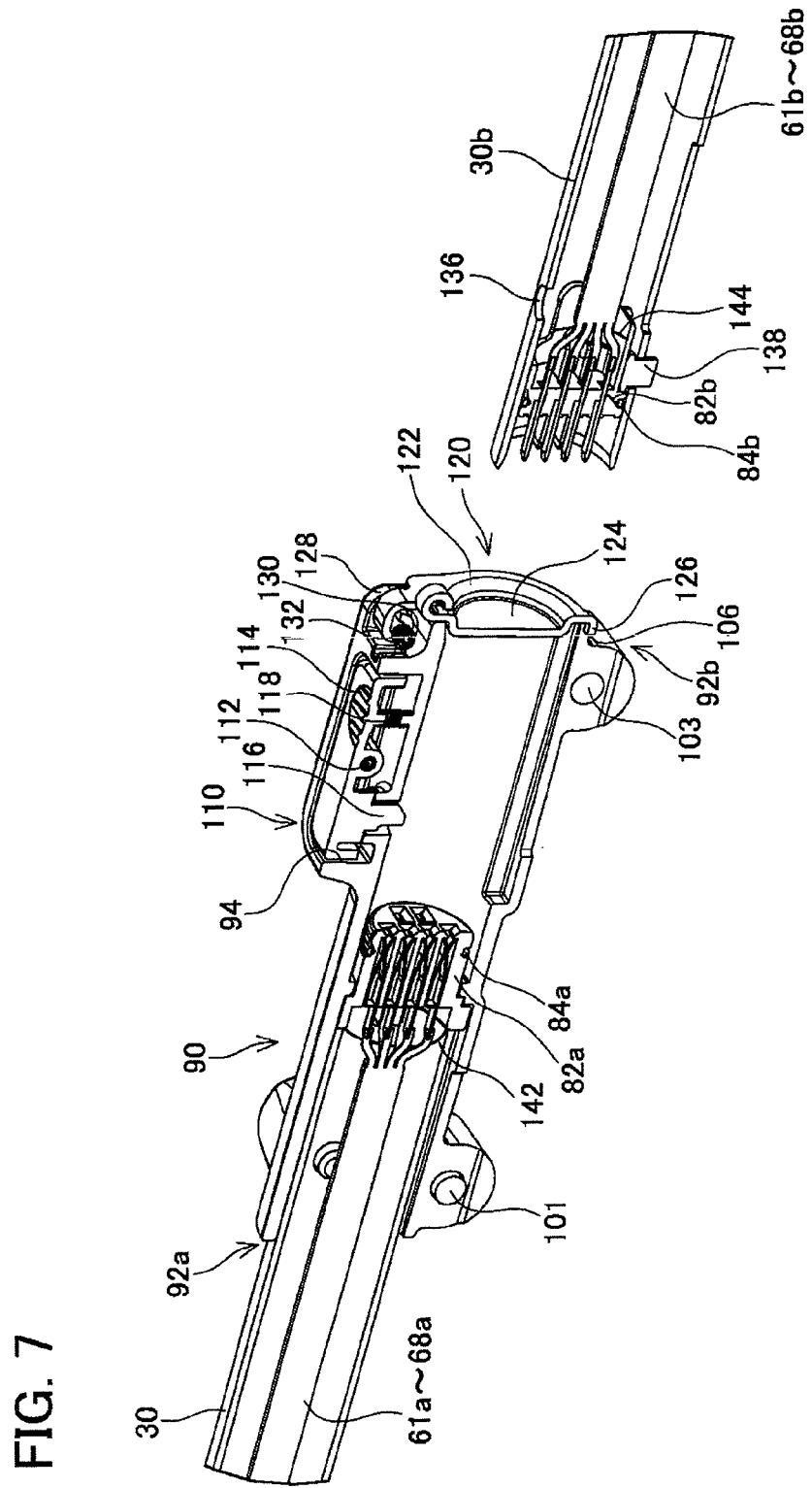
FIG. 7 shows a cross-sectional view of a first partial rod and a second partial rod which are separated from each other.

The motor controller 70 identifies the rotational position of the brushless motor 22, on the basis of the output signals from the three sensors 24, and switches the direction of the voltage applied to the coils 22*u*, 22*v*, 22*w* of the brushless motor 22, in accordance with the rotational position of the brushless motor 22. FIG. 3 shows an example of the direction of the voltage applied to the coils 22*u*, 22*v*, 22*w* in accordance with the rotational position of the brushless motor 22. In FIG. 3, the chart Vu shows the voltage applied to the U-phase coil 22*u*, the chart Vv shows the voltage applied to the V-phase coil 22*v*, and the chart Vw shows the voltage applied to the W-phase coil 22*w*. The direction of the current flowing in the coils 22*u*, 22*v*, 22*w* is also switched due to the switching of the direction of the voltage applied to the coils 22*u*, 22*v*, 22*w*. Here, the current flowing in the U-phase coil 22*u* is equal to the current flowing in the first motor power line 61, the current flowing in the V-phase coil 22*v* is equal to the current flowing in the second motor power line 62 and the current flowing in the W-phase coil 22*w* is equal to the current flowing in the third motor power line 63.

The motor controller 70 is also connected electrically to the trigger 34, the direction selector 36 and the speed dial 48, and in response to the user's manipulation of these, can adjust the current flowing in the respective motor power lines 61, 62, 63 accordingly. In addition, the motor controller 70 controls the operation of the cutoff circuit 46 in accordance with the user's manipulation of the trigger 34. Consequently, when the user pulls the trigger 34, the cutoff circuit 46 conducts electricity, and when the user returns the trigger 34, the cutoff circuit 46 ceases to conduct electricity.

In the brush cutter 10 according to the present embodiment, a brushless motor 22 is employed as the prime mover of the blade 12. The brushless motor 22 requires a motor controller 70 which switches the direction of the voltage applied to the coils 22*u*, 22*v*, 22*w* in accordance with the rotational position of the motor. If both the brushless motor 22 and the motor controller 70 are disposed in the front unit 20 as in a conventional brush cutter, then the size and weight of the front unit become large and the brush cutter becomes difficult to handle. On the other hand, in the brush cutter 10 according to the present embodiment, the brushless motor 22 is disposed in the front unit 20 and the motor controller 70 is disposed in the rear unit 40. If one of the brushless motor 22 and the motor controller 70 is disposed in the front unit 20 and the other thereof is disposed in the rear unit 40, then the size and weight of the front unit 20 can be reduced, while also suppressing increase in the size and weight of the rear unit 40. In other words, the difference between the size and weight of the front unit 20 and the rear unit 40 can be diminished. As a result of this, the brush cutter 10 becomes easier to handle.

Below, a concrete composition of a motor controller 70 will be described. However, the motor controller 70 of the brush cutter 10 is not limited to the mode described below, and it is also possible to employ various other commonly known motor controllers. The motor controller 70 according to the present embodiment is provided with six switching elements 71 to 76, a gate driver 78 and a processor 80. The processor 80 is connected electrically to the switching elements 71 to 76, via the gate driver 78.

The processor 80 selectively switches the switching elements 71 to 76 in accordance with an output signal from the three sensors 24. The six switching elements 71 to 76 constitute a circuit which selectively connects the motor power lines 61, 62, 63 to the positive electrode or the negative electrode of the battery pack 44. For example, if the first switching element 71 is turned on and the second switching element 72 is turned off, then the first motor power line 61 is connected to the positive electrode of the battery pack 44. Simultaneously with this, when the third switching element 73 is turned off and the fourth switching element 74 is turned on, then the second motor power line 62 is connected to a negative electrode of the battery pack 44. In this case, a current flows in the first motor power line 61 towards the front unit 20, and a current flows in the second motor power line 62 towards the rear unit 40. In this way, the processor 80 can switch the direction of the current flowing in the motor power lines 61, 62, 63, by selectively switching the six switching elements 71 to 76. In addition to this, the processor 80 is able to adjust the operation of the six switching elements 71 to 76 and thereby alter the speed of rotation and direction of rotation of the brushless motor 22, in accordance with the output signals from the trigger 34, the direction selector 36 and the speed dial 48.

The switching elements 71 to 76 are field effect transistors, and more precisely, MOSFETs having an insulating gate. However, the switching elements 71 to 76 may be other transistors including an IGBT, and may be switching elements of another type. However, in order to prevent overheating of the motor controller 70, the switching elements 71 to 76 desirably have low heat generation (heat loss). In respect of this point, if the brushless motor 22 and the motor controller 70 are disposed in the front unit 20, as in a conventional brush cutter, then it is conceivable to carry out forced cooling of the motor controller 70 by using a cooling fan of the brushless motor 22. However, in the brush cutter 10 according to the present embodiment, the brushless motor 22 and the motor controller 70 are disposed in mutually different units 20 and 40. Therefore, it is not possible to carry out forced cooling of the motor controller 70 by using the cooling fan of the brushless motor 22.

Accordingly, in the brush cutter 10 according to the present embodiment, suppressing the amount of generated heat (in other words, the loss) of the switching elements 71 to 76 has an important technical significance. In respect of this point, desirably, the switching elements 71 to 76 employ transistors having an on resistance equal to or smaller than 5 milliohm. If the on resistance is equal to or smaller than 5 milliohm, the amount of heat generated by the switching elements 71 to 76 is sufficiently suppressed, and the temperature of the motor controller 70 can be kept to a practicable level without requiring forced cooling by a cooling air flow, or the like. From a similar perspective, desirably, the switching elements 71 to 76 employ transistors having a gate resistance of no more than 1000 ohms. In this case also, the temperature of the motor controller 70 can be kept to a practicable level without requiring forced cooling by a cooling air flow, or the like. To give an example, in the present embodiment, a field-effect transistor having an on resistance of approximately 3.5 milliohms and a gate resistance of approximately 680 ohms is employed.

Next, the joint member 90 and the composition in the vicinity thereof is described with reference to FIG. 4, FIG. 5, FIG. 6 and FIG. 7. The joint member 90 is generally a tubular member, having a through hole 92 extending from one end 92*a* to the other end 92*b* thereof. The first partial rod 30*a* is inserted into the portion of the one end 92*a* side of the through hole 92. The joint member 90 and the first partial rod 30*a* are fixed to each other by a bolt 101 and a nut 102. The portion of the other end 92*a* side of the through hole 92 is an insertion hole into which the second partial rod 30*b* is inserted. The joint member 90 and the second partial rod 30*b* are fixed to each other by a bolt 103 and a nut 104. A lever 105 which can be operated by the user is provided on the nut 104 which fixes the second partial rod 30*b*. In the present specification, the portion of the through hole 92 on the other end 92*b* side may be called an insertion hole 92, and the other end 92*b* of the through hole 92 may be called an opening 92*b* of the insertion hole 92. The user can couple the first partial rod 30*a* and the second partial rod 30*b* with each other, by inserting the second partial rod 30*b* into the insertion hole 92 of the joint member 90. The user can separate the first partial rod 30*a* and the second partial rod 30*b* from each other, by removing the second partial rod 30*b* from the insertion hole 92 of the joint member 90.

A movable lid 120 is provided on the joint member 90. The movable lid 120 is supported pivotally by a shaft 130, and can be moved between an open position (see FIG. 4 and FIG. 5) and a closed position (see FIG. 6 and FIG. 7). When the movable lid 120 is in the open position, the insertion hole 92 of the joint member 90 is opened and when the movable lid 120 is in the closed position, then the insertion hole 92 of the joint member 90 is closed by the movable lid 120. A biasing member 132 is also provided on the joint member 90. The biasing member 132 biases the movable lid 120 towards the closed position. The biasing member 132 according to the present embodiment is, for example, a twist spring.

The movable lid 120 has a peripheral portion 122 and a central portion 124 which protrudes to one side with respect to the peripheral portion 122. When the movable lid 120 is located in the closed position, the peripheral portion 122 of the movable lid 120 abuts against the periphery of the opening 92*d* of the insertion hole 92. In this case, the central portion 124 of the movable lid 120 is inserted inside the insertion hole 92. By adopting a composition of this kind, when the movable lid 120 closes off the insertion hole 92, foreign matter and water is prevented effectively from entering inside the insertion hole 92.

The movable lid 120 has a knob 128. The knob 128 is one example of a manipulation portion which is manipulated by the user in order to move the movable lid 120 towards the open position. In other words, the user can open the movable lid 120 in a simple fashion, by manipulating the knob 128 with a finger. Additionally, the movable lid 120 has an engaging projection 126. When the movable lid 120 is in the closed position, the engaging projection 126 engages with a notch 106 that is provided in the joint member 90. By adopting a composition of this kind, when the movable lid 120 has closed the insertion hole 92, the movable lid 120 is stabilized with respect to the joint member 90.

A lock member 110 is provided on the joint member 90. The lock member 110 is a member for locking the second partial rod 30*b* with respect to the joint member 90. The lock member 110 is provided on an outer peripheral surface of the joint member 90. A recess 94 surrounded by a wall extending in a ring shape is formed on an outer peripheral surface of the joint member 90, and the lock member 110 is disposed inside the recess 94. The lock member 110 is supported by the shaft 112, and can pivot about the shaft 112. The lock member 110 is biased in one direction by the biasing member 118. The biasing member 118 according to the present embodiment is, for example, a coil spring.

A protrusion 116 is provided on the lock member 110. The protrusion 116 protrudes inside the insertion hole 92 via a hole 96 formed in the joint member 90. On the other hand, an engagement hole 136 which engages with the protrusion 116 is provided on the outer peripheral surface of the second partial rod 30*b*. Due to the protrusion 116 of the lock member 110 engaging with the engagement hole 136 of the second partial rod 30*b*, the second partial rod 30*b* is locked to the joint member 90. A release manipulation portion 114 is provided on the lock member 110. When the user presses the release manipulation portion 114, the lock member 110 rotates in the other direction (the opposite direction to the biasing direction by the biasing member 118), and the protrusion 116 is separated from the engagement hole 136. Therefore, the locking by the lock member 110 is released. The protrusion 116 and the release manipulation portion 114 are located on mutually opposite sides across a pivotal axis of the lock member 110 (in other words, the shaft 112).

A guide groove 98 extending along the axis direction (depth direction) of the insertion hole 92 is provided on the inner peripheral surface of the insertion hole 92 in the joint member 90. On the other hand, a guide projection 138 which engages with the guide groove 98 is provided on the outer peripheral surface of the second partial rod 30*b*. Thereby, the user is able to insert the second partial rod 30*b* into the joint member 90 in the correct orientation. As a further embodiment, it is also possible to provide a guide projection 138 on the inner peripheral surface of the insertion hole 92, and to provide a guide groove 98 in the outer peripheral surface of the second partial rod 30*b*.

The guide projection 138 according to the present embodiment may also protrude inside the second partial rod 30*b*, besides protruding outside the second partial rod 30*b*. The guide projection 138 abuts against the second electric connector 82*b* which is disposed inside the second partial rod 30*b*. Due to the guide projection 138 abutting against the second electric connector 82*b*, the second electric connector 82*b* is prevented from moving or rotating with respect to the second partial rod 30*b*. In this way, the guide projection 138 according to the present embodiment protrudes from the inner peripheral surface of the second partial rod 30*b* and also functions as a positioning member that abuts against the second electric connector 82*b*.

At least one portion of the first electric connector 82*a* protrudes from the first partial rod 30*a*, and forms an insertion portion which is inserted into the second partial rod 30*b*, when the first partial rod 30*a* and the second partial rod 30*b* are coupled with each other. A first seal member 84*a* is provided on the outer peripheral surface of the insertion portion (front end portion) of the first electric connector 82*a*. The first seal member 84*a* of the present embodiment is, for example, a ring member (a so-called "O-ring") which is made from a rubber material. The first seal member 84*a* seals a gap between the outer peripheral surface of the first electric connector 82*a* and the inner peripheral surface of the second partial rod 30*b*, when the first partial rod 30*a* and the second partial rod 30*b* are coupled with each other. Accordingly, infiltration of foreign material or water is prevented in the connecting portion of the pair of electric connectors 82.

Similarly, a second seal member 84*b* is provided on the outer peripheral surface of the second electric connector 82*b*. The second seal member 84*b* of the present embodiment is, for example, a ring member (a so-called "O-ring") which is made from a rubber material. The second seal member 84*b* seals a gap between the outer peripheral surface of the second electric connector 82*b* and an inner peripheral surface of the second partial rod 30*b*. Accordingly, infiltration of foreign material or water is prevented in the connecting portion of the pair of electric connectors 82. In particular, in the present embodiment, the connecting portion of the pair of electric connectors 82 is composed so as to be located in a sealed space formed by the first seal member 84*a*, the second seal member 84*b* and the inner peripheral surface of the second partial rod 30*b*.

Next, the first electric connector 82a and the second electric connector 82b will be described with reference to FIG. 8 and FIG. 9. The first electric connector 82a has a plurality of terminal holes 152 and a plurality of first electric terminals 154. One first electric terminal 154 is disposed in each of the terminal holes 152. One corresponding line, from among the first partial motor power lines 61a, 62a, 63a, the first partial sensor power lines 64a, 65a and the first partial sensor signal lines 66a, 67a, 68a, is connected to each of the first electric terminals 154. Binding portions between the first electric terminals 154 and the conductive lines 61a to 68a are covered with an electric insulating material (for example, a resin material) 142 (see FIG. 7). Consequently, deterioration and corrosion of the binding portion is prevented. Furthermore, all of the first electric terminals 154 are disposed in a range separated by no less than 1.5 mm from the outer peripheral surface of the first electric connector 82a. Therefore, the insulating properties between the first electric connector 82a and the first partial rod 30a are guaranteed. A groove 158 for holding the first seal member 84a is formed in a ring shape on the outer peripheral surface of the first electric connector 82a.

Figure 8:
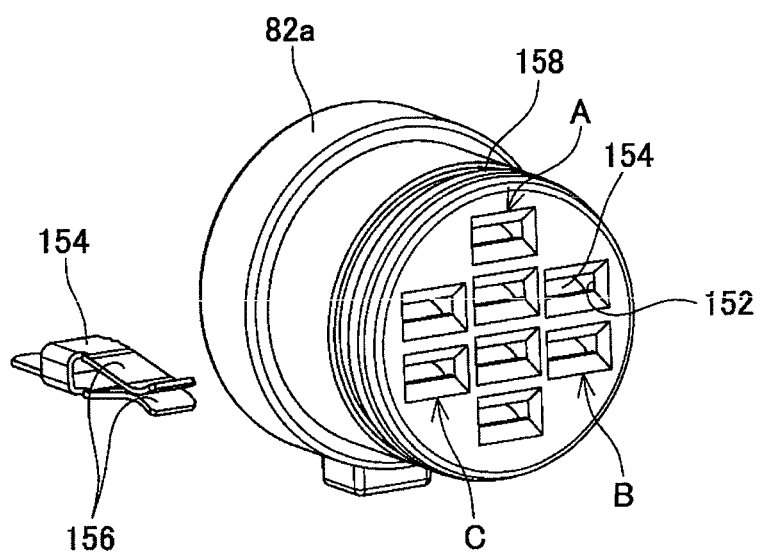
FIG. 8 shows a first electric connector.
Figure 9:
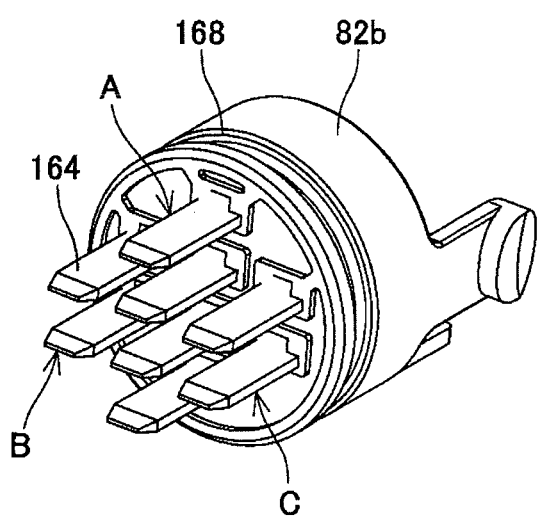
FIG. 9 shows a second electric connector.

For the purposes of the description, FIG. 8 also depicts a first electric terminal 154 separated from the first electric connector 82a. The first electric terminals 154 each have a pair of elastic strips 156 that faces each other. The first electric terminals 154 can be made from metal or another material having electrically conductive properties.

The second electric connector 82b has a plurality of second electric terminals 164. One corresponding line, from among the second partial motor power lines 61b, 62b, 63b, the second partial sensor power lines 64b, 65b and the second partial sensor signal lines 66b, 67b, 68b, is connected to each of the second electric terminals 164. Binding portions between the second electric terminals 164 and the conductive lines 61b to 68b is covered with an electric insulating material (for example, a resin material) 144 (see FIG. 7). Therefore, deterioration and corrosion of the binding portion due to water, and the like, that has infiltrated inside the second partial rod 30b is prevented. Furthermore, all of the second electric terminals 164 are disposed in such a manner that the distance thereof from the outer peripheral surface of the second electric connector 82b, and the distance between the terminals 164, is no less than 1.5 mm. Therefore, the insulating properties between the second electric connector 82b and the second partial rod 30b, and the insulating properties between the terminals 164, are guaranteed. A groove 168 for holding the second seal member 84b is formed in a ring shape on the outer peripheral surface of the second electric connector 82b.

The second electric terminals 164 have a plate shape. The second electric terminals 164 are inserted in between the pairs of elastic strips 156 of the first electric terminals 154, when the first partial rod 30a and the second partial rod 30b are coupled with each other. Due to the pairs of elastic strips 156 of the first electric terminals 154 contacting both sides of the second electric terminals 164, contact errors between the first electric terminals 154 and the second electric terminals 164 are prevented.

In the first electric connector 82a, a relatively large current flows in the three first electric terminals 154 which are connected to the first partial motor power lines 61a, 62a, 63a. Therefore, these three first electric terminals 154 generate a greater amount of heat than the other first electric terminals 154. For this reason, desirably, the three first electric terminals 154 in question are disposed so as not to be adjacent to each other. The three first electric terminals 154 in question can be disposed in the positions A, B, C shown in FIG. 8, for example.

Similarly, in the second electric connector 82b also, a relatively large current flows in the three second electric terminals 164 which are connected to the second partial motor power lines 61b, 62b, 63b. Therefore, these three second electric terminals 164 generate a greater amount of heat than the other second electric terminals 164. For this reason, desirably, the three second electric terminals 164 in question are disposed so as not to be adjacent to each other. The three second electric terminals 164 in question can be disposed in the positions A, B, C shown in FIG. 9, for example.

Figure 10:
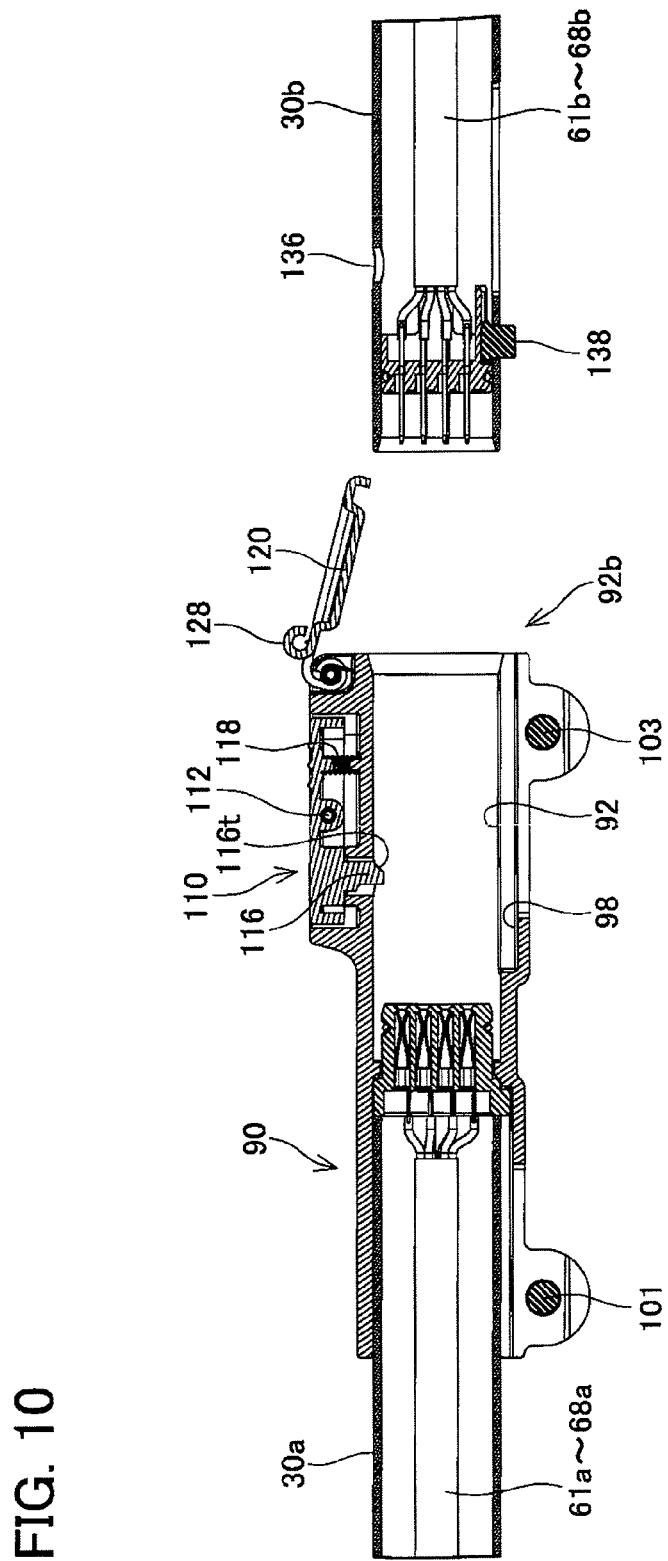
FIGS. 10 to 12 show a state where the first partial rod and the second partial rod are coupled.
Figure 11:
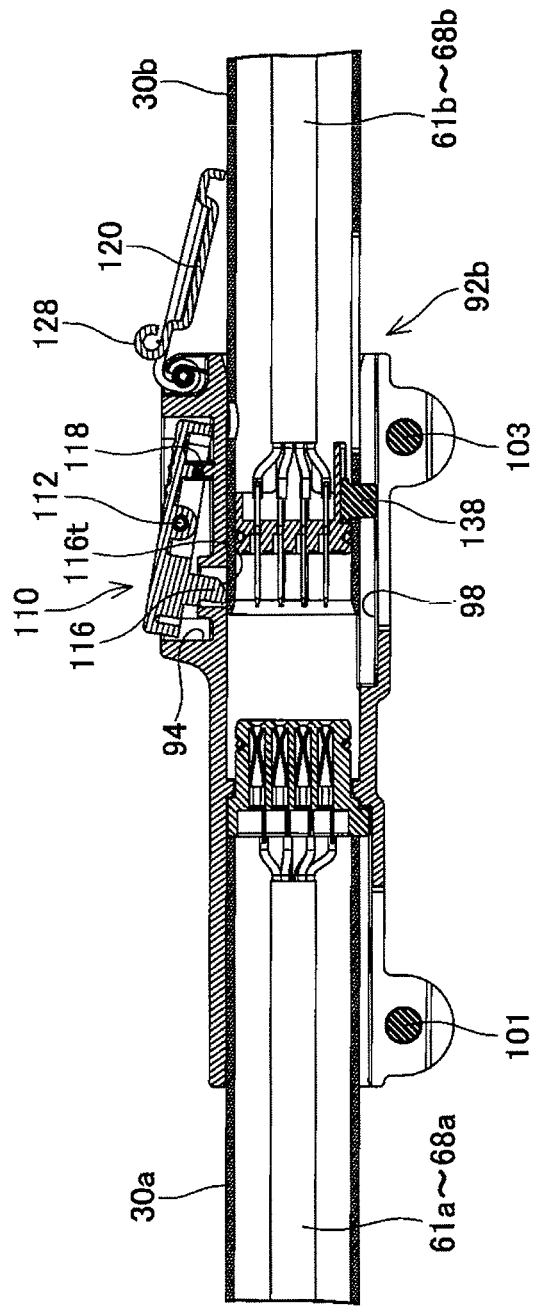
Figure 12:
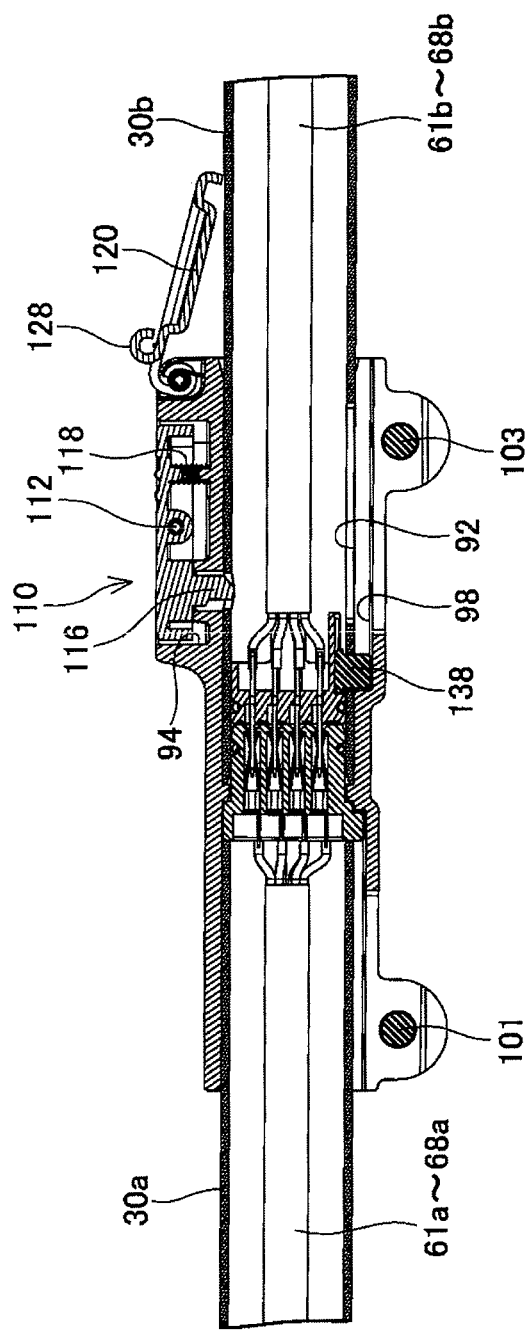

FIG. 10, FIG. 11 and FIG. 12 show states where the first partial rod 30a and the second partial rod 30b are coupled to each other. As shown in FIG. 10 and FIG. 11, when the user progressively inserts the second partial rod 30b into the insertion hole 92 of the joint member 90, the second partial rod 30b abuts against the protrusion 116 of the lock member 110. Here, a taper surface 116t which is inclined with respect to the direction of insertion of the second partial rod 30b (in other words, the axial direction of the insertion hole 92) is provided at the front end of the protrusion 116. The lock member 110 against which the second partial rod 30b has abutted pivots against the biasing force of the biasing member 118 and the protrusion 116 rides up onto the outer peripheral surface of the second partial rod 30b. When the second partial rod 30b is inserted further, as shown in FIG. 12, the engagement hole 136 of the second partial rod 30b reaches the position of the protrusion 116, and due to the biasing force of the biasing member 118, the protrusion 116 engages with the engagement hole 136 of the second partial rod 30b. While the user inserts the second partial rod 30b into the insertion hole 92 of the joint member 90, the guide projection 138 of the second partial rod 30b engages with the guide groove 98 of the joint member 90, whereby the second partial rod 30b is guided without rotating.

As shown in FIG. 12, when the protrusion 116 of the lock member 110 engages with the engagement hole 136 of the second partial rod 30b, the whole of the lock member 110 is positioned inside the recess 94 of the joint member 90. On the other hand, as shown in FIG. 11, when the protrusion 116 of the lock member 110 abuts against the outer peripheral surface of the second partial rod 30b, at least a portion of the lock member 110 is positioned outside the recess 94 of the joint member 90. By adopting a composition of this kind, erroneous operation of the lock member 110 is prevented, and it can be confirmed visually whether or not the lock member 110 has locked the second partial rod 30b.

In the present embodiment, the protrusion 116 of the lock member 110 is located on the opposite side from the opening 92b of the insertion hole 92 in the axial direction of the insertion hole 92 of the joint member 90, when viewed along the pivotal axis of the lock member 110 (in other words, the shaft 112). Adopting a composition of this kind provides the user a beneficial feature in which, when the user inserts the second partial rod 30b into the insertion hole 92 of the joint member 90 and, as a result, the second partial rod 30b abuts against the protrusion 116 of the lock member 110, the lock member 110 can pivot readily against the biasing force of the biasing member 118. This prevents the user from feeling a strong resisting force. On the other hand, if, for example, the protrusion 116 of the lock member 110 is located on the same side as the opening 92b of the insertion hole 92 in the axial direction of the insertion hole 92 of the joint member 90, when viewed along the pivotal axis of the lock member 110, then the lock member 110 cannot pivot readily against the biasing force of the biasing member 118, and the user feels a strong resisting force.

Figure 13A:
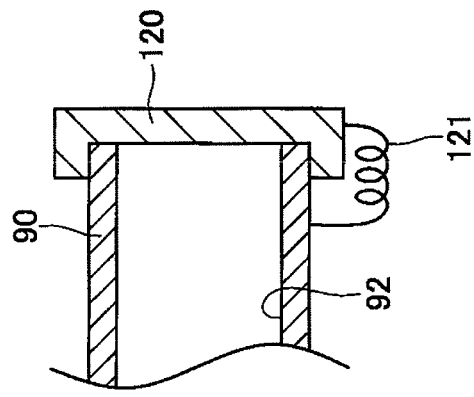
FIGS. 13A to 13C show modification examples of a movable lid.
Figure 13B:
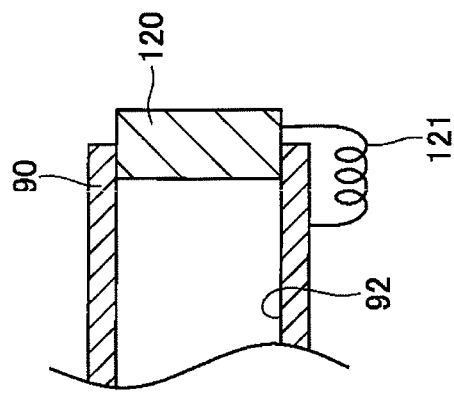
Figure 13C:
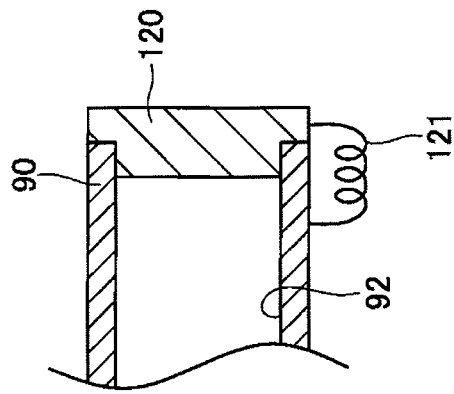

The movable lid 120 is not limited to the composition described in the embodiment. FIGS. 13A to 13C, FIGS. 14A to 14D and FIGS. 15A and 15B show modification examples of the movable lid 120. FIGS. 13A, 13B and 13C show examples where the movable lid 120 is attached to the joint member 90 by a flexible cord 121. FIGS. 14A, 14B, 14C and 14D show an example where the movable lid 120 is supported pivotably by the shaft 130, and the shaft 130 is composed slidably with respect to the joint member 90. FIGS. 15A and 15B show an example in which the movable lid 120 supported by the shaft 130 is composed pivotably towards the inside of the insertion hole 92. In each of the modification examples, the movable lid 120 is composed so as to be movable between an open position where the insertion hole 92 is open and a closed position where the insertion hole 92 is closed. Here, the movable lid 120 can also be provided in the end portion of the second partial rod 30b, and not only in the joint member 90.

Figure 16:
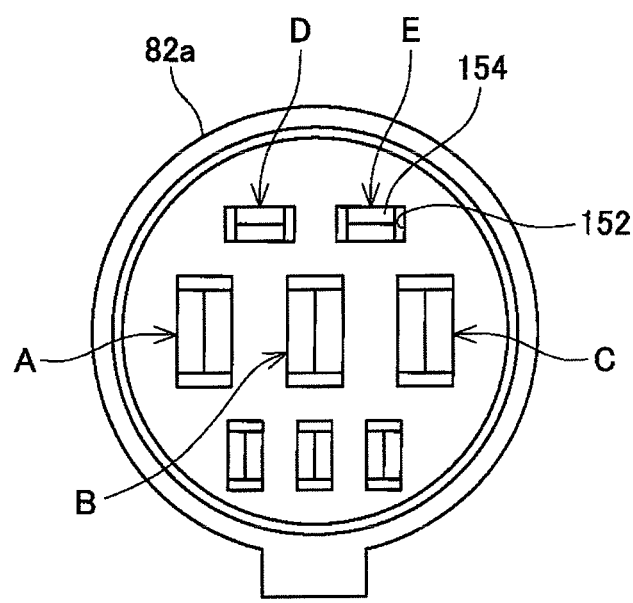
FIG. 16 shows a modification example of a first electric connector.
Figure 17:
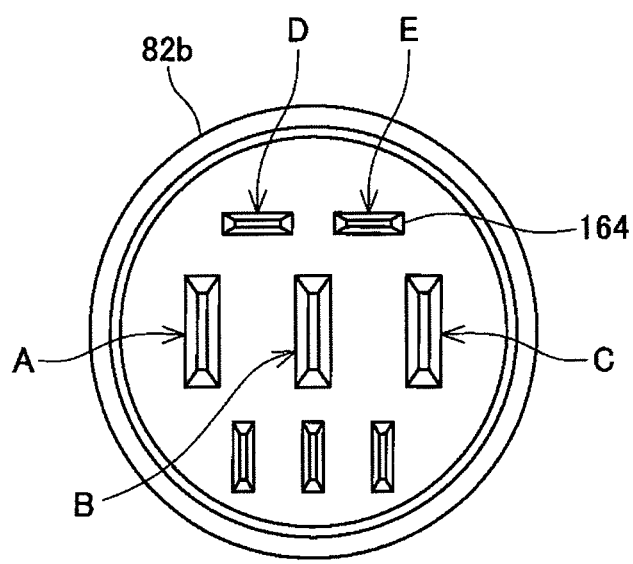
FIG. 17 shows a modification example of a second electric connector.

Furthermore, the pair of electric connectors 82 is not limited to the composition described in the embodiment. FIG. 16 and FIG. 17 show modification examples of the first electric connector 82a and the second electric connector 82b. As shown in FIG. 16, in the first electric connector 82a, the size and the orientation of a portion of the first electric terminals 154 can be made different to the other first electric terminals 154. In particular, relatively large terminals may be adopted for the first electric terminals 154 which are connected to the first partial motor power lines 61a, 62a, 63a, due to the fact that a relatively large current flows therein (see A, B, C in the drawings). Furthermore, by changing the orientation of a portion of the first electric terminals 154, it is possible to dispose the plurality of first electric terminals 154 in a compact arrangement (see D and E in the drawings).

Similarly, in the second electric connector 82b, the size and the orientation of a portion of the second electric terminals 164 can be made different to the other second electric terminals 164. In particular, relatively large terminals may be adopted for the second electric terminals 164 which are connected to the second partial motor power lines 61b, 62b, 63b, due to the fact that a relatively large current flows therein (see A, B, C in the drawings). Furthermore, by changing the orientation of a portion of the second electric terminals 164, it is possible to dispose the plurality of second electric terminals 164 in a compact arrangement (see D and E in the drawings).

The brush cutter 10 according to the present embodiment can employ a sensorless type of brushless motor as a prime mover for driving the tool 12. In this case, the sensor 24, the sensor power lines 64, 65 and the sensor signal lines 66, 67, 68 are not required.

The composition of the joint member 90 and the movable lid 120 described in the present embodiment can also be applied to a work machine which has an engine as a prime mover.

Further embodiments disclosed herein include, but are not limited to:

11. A work machine comprising:
an operation rod configured to be separated into at least a first partial rod and a second partial rod;
a joint member fixed to the first partial rod and comprising an insertion hole configured to receive insertion of the second partial rod;
a lock member pivotally supported by the joint member and comprising a protrusion that protrudes into the insertion hole;
an engagement hole provided on an outer peripheral surface of the second partial rod and configured to be engaged with the protrusion of the lock member, and
a biasing member biasing the lock member in one direction,
wherein, in an axial direction of the insertion hole of the joint member, the protrusion of the lock member is located at an opposite side of an opening of the insertion hole across an pivotal axis of the lock member.

12. The work machine as in embodiment 11, wherein
a recess where the lock member is disposed is provided on an outer surface of the joint member,
the lock member is entirely located within the recess when the protrusion engages with the engagement hole of the second partial rod, and
the lock member is at least partly located outside the recess when the protrusion contacts with the outer peripheral surface of the second partial rod.

13. The work machine as in embodiment 11 or 12, further comprising:
a guide groove provided on either an inner peripheral surface of the insertion hole or the outer peripheral surface of the second partial rod and extending along an axial direction of the insertion hole or the second partial rod; and
a guide projection provided on the other of the inner peripheral surface of the insertion hole or the outer peripheral surface of the second partial rod and configured to be engaged with the guide groove.

21. A work machine comprising:
an operation rod configured to be separated into at least a first partial rod and a second partial rod;
a joint member fixed to the first partial rod and comprising an insertion hole configured to receive insertion of the second partial rod; and
a movable lid supported by the joint member so as to move between an open position and a closed position, wherein the movable lid opens the insertion hole when in the open position and closes the insertion hole when in the closed position.

22. The work machine as in embodiment 21, further comprising:
a biasing member configured to bias the movable lid toward the closed position.

23. The work machine as in embodiment 21 or 22, wherein
the movable lid comprises a peripheral portion and a central portion that is raised from the peripheral portion, and
when the movable lid is located in the closed position, the peripheral portion contacts with an edge of an opening of the insertion hole and the central portion is located inside the insertion hole.

24. The work machine as in any one of embodiments 21 to 23, wherein
the movable lid comprises a manipulation portion configured to be manipulated by a user to move the movable lid to the open position.

31. A work machine comprising:
an operation rod configured to be separated into at least a first partial rod and a second partial rod;
a front unit disposed at a front end of the operation rod and configured to attach a tool;
a rear unit disposed at a rear end of the operation rod and configured to attach a battery;
a motor disposed in the front unit and configured to drive the tool;
at least one sensor disposed in the front unit and configured to detect a condition index of the motor;
a motor controller disposed in the rear unit and electrically coupled with the battery;
at least one motor power line disposed along the operation rod and configured to transmit electric power outputted from the motor controller to the motor;

at least one sensor signal line disposed along the operation rod and configured to transmit a signal outputted from the at least one sensor to the motor controller; and a pair of electric connectors including a first electric connector disposed on the first partial rod and a second electric connector disposed on the second partial rod, the first and second electric connectors being configured to be electrically connected to each other when the first and second partial rods are coupled with each other, wherein the motor power line comprises a first partial motor power line disposed along the first partial rod and electrically coupled with the first electric connector, and a second partial motor power line disposed along the second partial rod and electrically coupled with the second electric connector, the sensor signal line comprises a first partial sensor signal line disposed along the first partial rod and electrically coupled with the first electric connector, and a second partial sensor signal line disposed along the second partial rod and electrically coupled with the second electric connector, the first electric connector comprises a plurality of first electric terminals, each of which is coupled with corresponding one of the first partial motor power line or the first partial sensor signal line, the second electric connector comprises a plurality of second electric terminals, each of which is coupled with corresponding one of the second partial motor power line or the second partial sensor signal line, and each of the plurality of first electric terminals is electrically connected to corresponding one of the plurality of second electric terminals when the first and second partial rods are coupled with each other.

32. The work machine as in embodiment 31, wherein one of the first electric terminals coupled with the first partial motor power line is larger in size than one of the first electric terminals coupled with the first partial sensor signal line.

33. The work machine as in embodiment 31, wherein one of the first electric terminals coupled with the first partial motor power line is identical in size with one of the first electric terminals coupled with the first partial sensor signal line.

34. The work machine as in any one of embodiments 31 to 33, wherein one of the second electric terminals coupled with the second partial motor power line is larger in size than one of the second electric terminals coupled with the second partial sensor signal line.

35. The work machine as in any one of embodiments 31 to 33, wherein one of the second electric terminals coupled with the second partial motor power line is identical in size with one of the second electric terminals coupled with the second partial sensor signal line.

36. The work machine as in any one of embodiments 31 to 35, wherein the first electric connector is configured such that two of the first electric terminals coupled with the first partial motor power lines respectively are not adjacent to each other.

37. The work machine as in any one of embodiments 31 to 36, wherein the second electric connector is configured such that two of the second electric terminals coupled with the second partial motor power lines respectively are not adjacent to each other.

41. A work machine comprising:
an operation rod configured to be separated into at least a first partial rod and a second partial rod;
a front unit disposed at a front end of the operation rod and configured to attach a tool;
a rear unit disposed at a rear end of the operation rod and configured to attach a battery;
a motor disposed in the front unit and configured to drive the tool;
a motor controller disposed in the rear unit and electrically coupled with the battery;
at least three conductive lines disposed along the operation rod and configured to electrically couple the front unit with the rear unit; and
a pair of electric connectors including a first electric connector disposed on the first partial rod and a second electric connector disposed on the second partial rod, the first and second electric connectors being configured to be electrically connected to each other when the first and second partial rods are coupled with each other, wherein each of the at least three conductive lines comprises a first partial conductive line disposed along the first partial rod and electrically coupled with the first electric connector and a second partial conductive line disposed along the second partial rod and electrically coupled with the second electric connector, the first electric connector comprises at least three first electric terminals, each of which is coupled with corresponding one of the first partial conductive lines, the second electric connector comprises at least three second electric terminals, each of which is coupled with corresponding one of the second partial conductive lines, and each of the at least three first electric terminals is electrically connected to corresponding one of the at least three second electric terminals when the first and second partial rods are coupled with each other.

42. The work machine as in embodiment 41, wherein the at least three conductive lines include three motor power lines configured to transmit electric power outputted from the motor controller to the motor.

43. The work machine as in embodiment 41 or 42, further comprising at least one sensor disposed in the front unit and configured to detect a condition index of the motor, wherein the at least three conductive lines include at least one sensor signal line configured to transmit a signal outputted from the at least one sensor to the motor controller.

44. The work machine as in embodiment 43, wherein the at least three conductive lines include at least one sensor power line configured to supply electric power to the at least one sensor.

45. The work machine as in embodiment 43, wherein the at least three conductive lines include at least three sensor signal lines and at least two sensor power lines.

51. A work machine comprising:
an operation rod configured to be separated into at least a first partial rod and a second partial rod;
a front unit disposed at a front end of the operation rod and configured to attach a tool;
a rear unit disposed at a rear end of the operation rod and configured to attach a battery;
a motor disposed in the front unit and configured to drive the tool;
at least one conductive line disposed along the operation rod and configured to electrically couple the front unit with the rear unit; and
a pair of electric connectors including a first electric connector disposed on the first partial rod and a second electric connector disposed on the second partial rod, the first and second electric connectors being configured to be electrically connected to each other when the first and second partial rods are coupled with each other, wherein each of the at least one conductive line comprises a first partial conductive line disposed along the first partial rod and a second partial conductive line disposed along the second partial rod, the first electric connector comprises at least one first electric terminal, each of which is coupled with corresponding one of the first partial conductive line, the second electric connector comprises at least one second electric terminal, each of which is coupled with corresponding one of the second partial conductive line, each of the at least one first electric terminal is electrically connected to corresponding one of the at least one second electric terminal when the first and second partial rods are coupled with each other, each of the at least one first electric terminal comprises a pair of elastic strips that faces each other, and each of the at least one second electric terminal comprises a plate-shape portion configured to be inserted between the pair of elastic strips.

52. The work machine as in embodiment 51, wherein the first electric connector comprises a plurality of terminal holes, and each of the plurality of terminal holes houses the pair of the elastic strips of the corresponding first electric terminal.

61. A work machine comprising:
an operation rod configured to be separated into at least a first partial rod and a second partial rod;
a front unit disposed at a front end of the operation rod and configured to attach a tool;
a rear unit disposed at a rear end of the operation rod and configured to attach a battery;
a motor disposed in the front unit and configured to drive the tool;
at least one conductive line disposed along the operation rod and configured to electrically couple the front unit with the rear unit; and
a pair of electric connectors including a first electric connector disposed on the first partial rod and a second electric connector disposed on the second partial rod, the first and second electric connectors being configured to be electrically connected to each other when the first and second partial rods are coupled with each other,
wherein each of the at least one conductive line comprises a first partial conductive line disposed along the first partial rod and a second partial conductive line disposed along the second partial rod,
the first electric connector comprises at least one first electric terminal, each of which is coupled with corresponding one of the first partial conductive line,
the second electric connector comprises at least one second electric terminal, each of which is coupled with corresponding one of the second partial conductive line,
each of the at least one first electric terminal is electrically connected to corresponding one of the at least one second electric terminal when the first and second partial rods are coupled with each other,
the first electric connector comprises an insertion portion configured to be inserted into the second partial rod when the first and second partial rods are coupled with each other, and
a first seal member is provided on either an outer peripheral surface of the insertion or an inner peripheral surface of the second partial rod so as to seal a gap between the insertion portion and the second partial rod.

62. The work machine as in embodiment 61, wherein a second seal member is provided on either an outer peripheral surface of the second electric terminal or an inner peripheral surface of the second partial rod so as to seal a gap between the second electric terminal and the second partial rod, and contacting portions of the pair of electric connectors are located within an enclosed space formed between the first and second seal members when the first and second partial rods are coupled with each other.

63. The work machine as in embodiment 61 or 62, wherein at least one of a binding portion of the first electric terminal and the first partial conductive line or a binding portion of the second electric terminal and the second partial conductive line is covered with an electric insulating material.

64. The work machine as in any one of embodiments 61 to 63, wherein the second partial rod comprises a positioning member that protrudes from an inner surface of the second partial rod and is configured to contact with the first electric connector.

65. The work machine as in embodiment 64, further comprising a joint member fixed to the first partial rod and comprising an insertion hole configured to receive insertion of the second partial rod, wherein the positioning member includes a portion protruding from an outer surface of the second partial rod so as to engage with a guide groove formed on an inner surface of the insertion hole.

What is claimed is:
1. A work machine, comprising:
an operation rod configured to be separated into at least a first partial rod and a second partial rod;
a front unit disposed at a front end of the operation rod and configured to attach a tool;
a rear unit disposed at a rear end of the operation rod and configured to attach a battery;
a handle provided on a middle portion of the operation rod;
a motor disposed in the front unit and configured to drive the tool;
at least one sensor disposed in the front unit and configured to detect a condition index of the motor;
a motor controller disposed in the rear unit, in order to reduce the size and weight of the front unit, and electrically coupled with the battery;
at least one motor power line disposed along the operation rod and configured to transmit electric power outputted from the motor controller to the motor;
at least one sensor signal line disposed along the operation rod and configured to transmit a signal outputted from the at least one sensor to the motor controller; and
a pair of electric connectors including a first electric connector disposed on the first partial rod and a second electric connector disposed on the second partial rod, the first and second electric connectors being configured to be electrically connected to each other when the first and second partial rods are coupled with each other,
wherein the motor power line comprises a first partial motor power line disposed along the first partial rod and electrically coupled with the first electric connector, and a second partial motor power line disposed along the second partial rod and electrically coupled with the second electric connector,
the sensor signal line comprises a first partial sensor signal line disposed along the first partial rod and electrically coupled with the first electric connector, and a second partial sensor signal line disposed along the second partial rod and electrically coupled with the second electric connector,
the first electric connector comprises a plurality of first electric terminals, each of which is coupled with corre- sponding one of the first partial motor power line or the first partial sensor signal line, the second electric connector comprises a plurality of second electric terminals, each of which is coupled with corresponding one of the second partial motor power line or the second partial sensor signal line, and each of the plurality of first electric terminals is electrically connected to corresponding one of the plurality of second electric terminals when the first and second partial rods are coupled with each other.

2. The work machine as in claim 1,
wherein one of the first electric terminals coupled with the first partial motor power line is larger in size than one of the first electric terminals coupled with the first partial sensor signal line.

3. The work machine as in claim 2,
wherein one of the second electric terminals coupled with the second partial motor power line is larger in size than one of the second electric terminals coupled with the second partial sensor signal line.

4. The work machine as in claim 3,
wherein the first electric connector is configured such that two of the first electric terminals coupled with the first partial motor power lines respectively are not adjacent to each other.

5. The work machine as in claim 1,
wherein one of the first electric terminals coupled with the first partial motor power line is identical in size with one of the first electric terminals coupled with the first partial sensor signal line.

6. The work machine as in claim 5,
wherein one of the second electric terminals coupled with the second partial motor power line is identical in size with one of the second electric terminals coupled with the second partial sensor signal line.

7. The work machine as in claim 6,
wherein the first electric connector is configured such that two of the first electric terminals coupled with the first partial motor power lines respectively are not adjacent to each other.

8. The work machine as in claim 7,
wherein the second electric connector is configured such that two of the second electric terminals coupled with the second partial motor power lines respectively are not adjacent to each other.

9. The work machine as in claim 1,
wherein the first electric connector is configured such that two of the first electric terminals coupled with the first partial motor power lines respectively are not adjacent to each other.

10. The work machine as in claim 9,
wherein the second electric connector is configured such that two of the second electric terminals coupled with the second partial motor power lines respectively are not adjacent to each other.

11. The work machine as in claim 1,
wherein the at least one sensor is configured to detect a rotational position of the motor.

12. The work machine as in claim 11,
wherein the motor controller is configured to connect each of the at least one motor power line with either a positive electrode or a negative electrode of the battery in accordance with the rotational position detected by the at least one sensor.

13. The work machine as in claim 12,
wherein the motor is a brushless motor compring a U-phase terminal, V-phase terminal and W-phase terminal, and the at least one plurality of motor power lines includes a first motor power line connected to the U-phase terminal, a second motor power line connected to the U-phase terminal, and a third motor line connected to the W-phase terminal.

14. The work machine as in claim 1,
wherein the handle has a controller that includes a trigger to operate and stop the tool, and a direction selector to switch the direction of rotation of the tool.

15. The work machine as in claim 1, further comprising:
a joint member fixed to the first partial rod and comprising an insertion hole configured to receive insertion of the second partial rod;

a lock member pivotally supported by the joint member and comprising a protrusion that protrudes into the insertion hole;

an engagement hole provided on an outer peripheral surface of the second partial rod and configured to be engaged with the protrusion of the lock member; and a biasing member biasing the lock member in one direction, wherein, in an axial direction of the insertion hole of the joint member, the protrusion of the lock member is located at an opposite side of an opening of the insertion hole across a pivotal axis of the lock member.

16. The work machine as in claim 15,
wherein a recess where the lock member is disposed is provided on an outer surface of the joint member, the lock member is entirely located within the recess when the protrusion engages with the engagement hole of the second partial rod, and the lock member is at least partly located outside the recess when the protrusion contacts with the outer peripheral surface of the second partial rod.

17. The work machine as in claim 15, further comprising:
a guide groove provided on either an inner peripheral surface of the insertion hole or the outer peripheral surface of the second partial rod and extending along an axial direction of the insertion hole or the second partial rod; and a guide projection provided on the other of the inner peripheral surface of the insertion hole or the outer peripheral surface of the second partial rod and configured to be engaged with the guide groove.

18. The work machine as in claim 1, further comprising:
a joint member fixed to the first partial rod and comprising an insertion hole configured to receive insertion of the second partial rod; and a movable lid supported by the joint member so as to move between an open position and a closed position, wherein the movable lid opens the insertion hole when in the open position and closes the insertion hole when in the closed position.

19. The work machine as in claim 18,
wherein the movable lid comprises a peripheral portion and a central portion that is raised from the peripheral portion, and when the movable lid is located in the closed position, the peripheral portion contacts with an edge of an opening of the insertion hole and the central portion is located inside the insertion hole.

20. The work machine as in claim 1, further comprising:
a biasing member configured to bias the movable lid toward the closed position.

\* \* \* \* \*

UNITED STATES PATENT AND TRADEMARK OFFICE
CERTIFICATE OF CORRECTION

PATENT NO.        : 9,198,347 B2
APPLICATION NO.   : 14/102885
DATED             : December 1, 2015
INVENTOR(S)       : Tatsuya Nagahama Page 1 of 1

It is certified that error appears in the above-identified patent and that said Letters Patent is hereby corrected as shown below:

In the Claims

In column 20, line 2 (claim 13) the term "compring" should read -- comprising --.

Signed and Sealed this
Ninth Day of August, 2016

Michelle K. Lee
*Director of the United States Patent and Trademark Office*